Patented Dec. 10, 1935

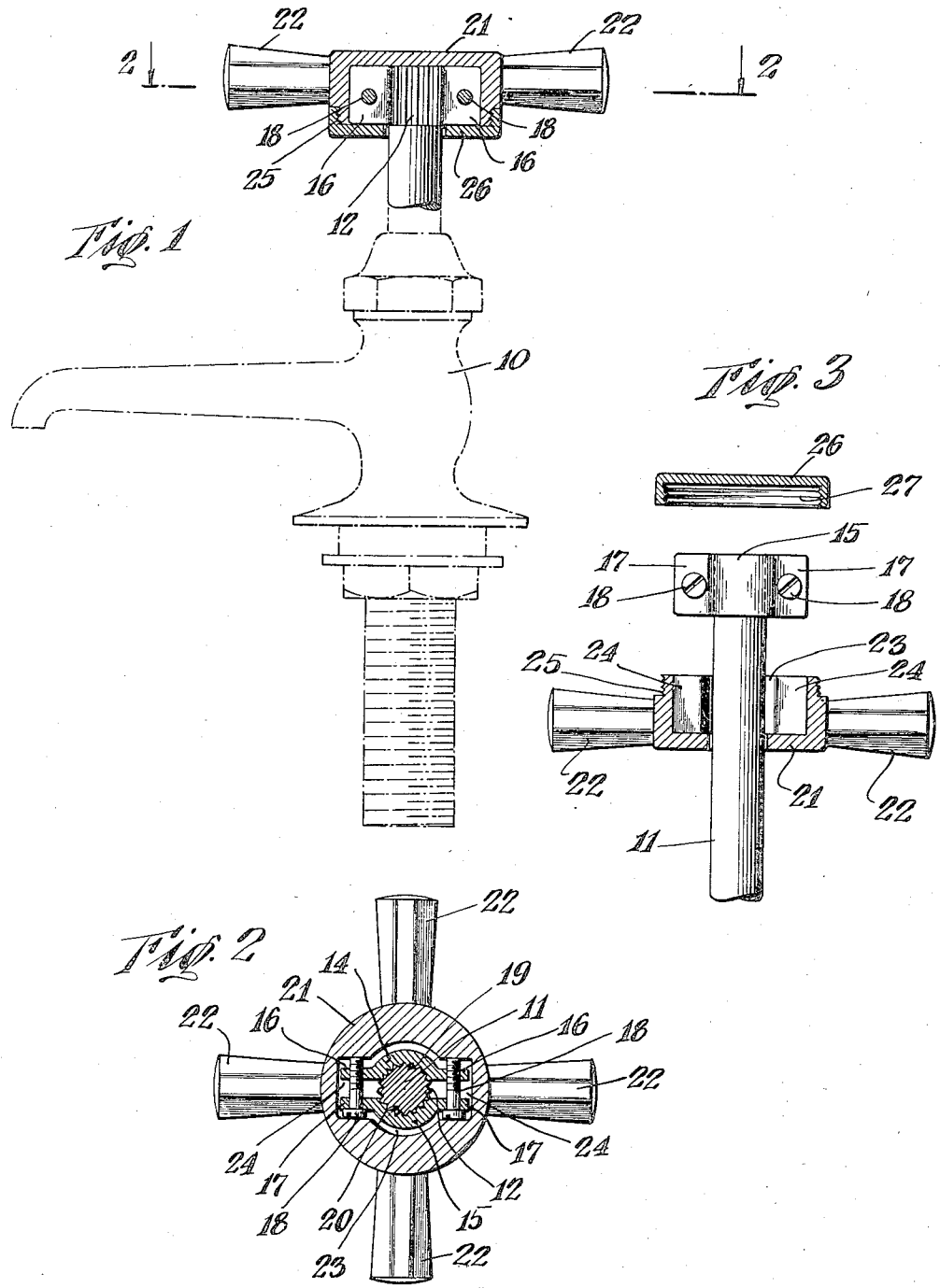

2,023,951

UNITED STATES PATENT OFFICE 2,023,951

HANDLE ASSEMBLY FOR VALVES OR THE LIKE

Mortimer J. Cohan, Bronx, N. Y.

Application May 24, 1934, Serial No. 727,239

2 Claims. (Cl. 287—53)

My present invention relates to a handle assembly which is adapted to be connected to valve stems or the like, and more particularly to means whereby the handle may be conveniently connected to valve stems of various types and sizes.

It is found in practice that valve stems, such as are ordinarily provided in radiator valves, faucets and the like, are made in various types and diameters, and the handles provided therefor are adapted to fit only the particular valve stems to which they are first connected. In order to meet this condition, the supply houses have been required to carry large stocks of valve handles in various sizes and types. As a result of this condition, it is often extremely difficult to obtain a handle which will fit a given stem, when replacement is required, and the replacement of an entire valve is necessary in many cases to remedy the loss or breakage of a valve handle. It will be apparent that such a situation involves considerable expense in maintenance and often results in great inconvenience.

The principal objects of the present invention, therefore, are to overcome the difficulties mentioned above. It is one of the objects of the present invention to provide a handle having means whereby the handle is adapted to fit various sized stems. Another object of the present invention is to provide a valve handle for the purpose aforesaid whereby replacement of lost or broken handles may be readily and conveniently made without affecting the valve installation. Still another object of the present invention is to provide a valve handle of the character described which is economical to manufacture, simple in construction, durable in use and pleasing in appearance. Other objects and advantages of the invention will be pointed out hereinafter and will be partly apparent to those skilled in the art to which the present invention relates.

With the foregoing objects in view, my present invention consists of the novel construction, arrangement and combination of parts hereinafter described and illustrated in the accompanying drawing, forming an integral part of this specification.

In the accompanying drawing, wherein I have illustrated the preferred embodiments of my present invention, Fig. 1 is an elevation of a valve casing with a handle embodying my invention applied to the stem thereof, the handle being shown in partial longitudinal section;

Fig. 2 is a cross section of Fig. 1 on the line 2—2;

Fig. 3 is an elevation of a valve stem and handle embodying a modified form of my invention, the handle being disassembled and shown in partial longitudinal section.

Referring now to the drawing wherein like reference characters indicate corresponding parts throughout the several views 10 designates the valve casing of a common form of valve presently used for water faucets and the like. Projecting upwardly from the casing 10 is the valve stem 11, the upper end of which is preferably provided with longitudinal ribs or flutes 12. Mounted upon the upper end of the valve stem 11 is a segmental collar comprising the two members 14 and 15 each of which is provided with lateral projections 16 and 17 respectively. The members 14 and 15 are clamped upon the upper end of the valve stem 11 by means of clamping screws 18 which pass through the lateral projections of the members 14 and 15. The inner surfaces of the members 14 and 15 are also provided with longitudinal ribs or flutes 19 and 20 which are adapted to interlock with the ribs 12 on the upper portion of the valve stem 11. In this manner the members 14 and 15 are secured to the stem 11 and are prevented from rotating relatively thereto.

The handle illustrated in the preferred embodiment shown in the accompanying drawing is that commonly known as the four-arm type. It is to be understood, however, that the shape and form of the handle is immaterial to the present invention and that the handle may be composed of any suitable metal, alloy or other material. As illustrated in the drawing, the handle comprises a hub 21 and arms 22 which are radially disposed relative to the hub. The hub 21 is provided with a centrally disposed recess 23 having lateral extensions 24 on opposite sides thereof, the shape of the recess 23 being such as to provide for the convenient insertion of the segmental collar which is mounted on and clamped to the upper portion of the stem 11. It will be apparent that the lateral projections 16 and 17 of the members 14 and 15 will be engaged in the lateral extensions 24 of the recess 23, by means of which arrangement the stem 11 is adapted to rotate in unison with the handle when the handle is turned. The hub 21 is preferably provided with an external thread 25. A hub cap 26 provided with an internal thread 27 and a centrally disposed aperture is loosely mounted on the stem 11 and is adapted to engage the hub 21 for securing the handle to the stem.

In Figs. 1 and 2 of the drawing I have shown an embodiment of my invention wherein the handle is placed over the end of the valve stem and is secured to the stem by the hub cap which is mounted on the stem. In Fig. 3 of the drawing I have shown a modified embodiment of my invention wherein the handle is mounted on the stem and is secured to the stem by the hub cap which is placed over the end of the stem. In the former embodiment the hub cap requires a centrally disposed aperture for mounting on the stem. In the latter embodiment the hub of the handle requires a centrally disposed aperture therethrough for mounting on the stem.

In connecting the handle to the stem as taught by the embodiment of my invention illustrated in Figs. 1 and 2, I first mount the hub cap 26 on the stem 11; then I clamp the members 14 and 15 to the upper end of the stem 11; then I place the handle over the end of the stem 11 so that the members 14 and 15 are engaged in the recess 13; finally I draw up the hub cap 26 and screw it on tightly to the hub 21. In connecting the handle to the stem as taught by the embodiment of my invention illustrated in Fig. 3, I first mount the handle on the stem 11; then I clamp the members 14 and 15 to the upper end of the stem 11; then I draw up the handle to receive the members 14 and 15 in the recess 13; finally I place the hub cap 26 over the end of the stem 11 and screw it on tightly to the hub 21.

It is quite obvious that the connection of my improved handle assembly to the stem of a valve is accomplished with little effort. The members 14 and 15 may be readily adjusted by means of the screw 18 to engage stems of various diameters and types, thus permitting the same handle to be applied to a variety of valve stems and enabling the quick replacement of a handle when required. It will also be apparent that the structure is exceedingly simple and the completed assembly presents a valve handle which is attractive and pleasing in appearance.

Although I have illustrated and described the preferred embodiments of my invention, I desire it to be understood that I do not intend to limit myself to the specific embodiments of my invention hereinbefore illustrated and described, but that slight changes in the details of construction are contemplated which will come within the scope and spirit of my invention as set forth in the appended claims.

Having thus illustrated and described my present invention, what I claim as new and desire to secure by Letters Patent is:

1. In combination with a valve stem or the like, of a segmental collar engaging the end portion of the stem and adapted to prevent relative rotation of the stem and collar bolts joining the segments of said collar for clamping same to the stem, a handle having a grasping portion and a centrally disposed hub provided with a recess adapted for non-rotatively receiving said segmental collar, and a hub cap threaded to the hub for enclosing the segmental collar within the handle and for securing the handle to the stem.

2. In combination with a valve stem or the like having a fluted end portion, of a segmental collar engaging the stem, comprising two members each having a fluted inner surface adapted to interlock with the fluted portion of the stem to prevent relative rotation of the stem and collar, the members of said segmental collar having lateral extensions, bolts passing through said lateral extensions for relative spacing of the members to provide for engaging stems of various sizes, a handle having a grasping portion and a centrally disposed hub provided with a recess adapted for non-rotatably receiving said segmental collar, and a hub cap threaded to the hub for enclosing the segmental collar within the handle and for securing the handle to the stem.

MORTIMER J. COHAN.